(12) United States Patent
Collins et al.

(10) Patent No.: US 6,173,780 B1
(45) Date of Patent: Jan. 16, 2001

(54) PROCESS FOR INCREASING EFFECTIVENESS OF PRODUCTION CHEMICALS BY REDUCING NUMBER OF SQUEEZING AND SHUT-IN OPERATIONS REQUIRED TO INCREASE PRODUCTION RATE FROM AN OIL WELL

(75) Inventors: Ian Ralph Collins, Sunbury on Thames; Nevin John Stewart, Guildford, both of (GB)

(73) Assignee: BP Chemicals Limited, London (GB)

( * ) Notice: Under 35 U.S.C. 154(b), the term of this patent shall be extended for 0 days.

(21) Appl. No.: 09/152,268

(22) Filed: Sep. 14, 1998

Related U.S. Application Data

(63) Continuation of application No. PCT/GB97/00634, filed on Mar. 7, 1997.

(30) Foreign Application Priority Data

| Mar. 15, 1996 | (GB) | 9605529 |
| Jul. 5, 1996 | (GB) | 9614096 |
| Jan. 13, 1997 | (GB) | 9700534 |

(51) Int. Cl.[7] .................. E21B 37/06; E21B 43/16
(52) U.S. Cl. ............. 166/305.1; 166/300; 166/304
(58) Field of Search ..................... 166/263, 279, 166/300, 304, 305.1

(56) References Cited

U.S. PATENT DOCUMENTS

| 2,753,939 | * | 7/1956 | Carpenter et al. | 166/303 |
| 3,131,759 | * | 5/1964 | Slusser et al. | 166/305.1 |
| 3,395,757 | * | 8/1968 | Crossland | 166/304 |
| 3,483,925 | | 12/1969 | Slyker | 166/279 |
| 3,693,720 | * | 9/1972 | McDougall et al. | 166/304 |
| 3,902,557 | * | 9/1975 | Shaughnessy et al. | 166/295 |
| 3,998,743 | * | 12/1976 | Maly et al. | 507/203 |
| 4,207,193 | * | 6/1980 | Ford et al. | 507/243 |
| 4,511,001 | * | 4/1985 | Wu | 166/310 |
| 4,518,511 | * | 5/1985 | Kaufman et al. | 507/218 |
| 4,595,511 | * | 6/1986 | Seybold et al. | 507/246 |
| 4,668,408 | * | 5/1987 | McClaflin et al. | 507/262 |
| 4,844,158 | * | 7/1989 | Jennings, Jr. | 166/267 |
| 5,002,126 | | 3/1991 | Carlberg | 166/279 |
| 5,263,539 | * | 11/1993 | Salimi et al. | 166/263 |
| 5,655,601 | * | 8/1997 | Oddo et al. | 166/279 |
| 5,690,174 | * | 11/1997 | Chapman et al. | 166/275 |

FOREIGN PATENT DOCUMENTS

| 0 224 346 | 6/1987 | (EP) . |
| WO 96 22451 | 7/1996 | (WO) . |

* cited by examiner

*Primary Examiner*—David Bagnell
*Assistant Examiner*—Jennifer Dougherty
(74) *Attorney, Agent, or Firm*—Nixon & Vanderhye

(57) ABSTRACT

The invention relates to a process for increasing the effectiveness of production chemicals by reducing the number of squeezing and shut-in operations needed to increase the production rate from an oil well. The process includes injecting into an oil-bearing rock formation matrix a water-miscible formulation comprising: (a) a water-miscible surfactant which is an alkyltriglycol ether and (b) at least one water-miscible oil field or gas field production chemical. Components (a) and (b) are introduced either as a pre-formed, single, homogeneous composition, or simultaneously in parallel or sequentially in either order into the rock formation. After introduction of (a) and (b) into the oil-bearing rock formation, the well is shut-in for a period and, subsequently, the oil-bearing rock formation matrix is over-flushed with an oil.

43 Claims, No Drawings

PROCESS FOR INCREASING EFFECTIVENESS OF PRODUCTION CHEMICALS BY REDUCING NUMBER OF SQUEEZING AND SHUT-IN OPERATIONS REQUIRED TO INCREASE PRODUCTION RATE FROM AN OIL WELL

This is a continuation of PCT application PCT/GB97/00634, filed Mar. 7, 1997.

This invention relates to oil field chemicals in particular oil field production chemicals and their use.

BACKGROUND OF THE INVENTION

Among oil field chemicals are scale inhibitors, which are used in production wells to stop scaling in the rock formation and/or in the production lines downhole and at the surface. Scaling not only causes a restriction in pore size in the rock formation matrix (also known as 'formation damage') and hence reduction in the rate of oil and/or gas production but also blockage of tubular and pipe equipment during surface processing. To overcome this, the production well is subjected to a so called "shut-in" treatment whereby an aqueous composition comprising a scale inhibitor is injected into the production well, usually under pressure, and "squeezed" into the formation and held there. In the squeeze procedure, scale inhibitor is injected several feet radially into the production well where it is retained by adsorption and/or formation of a sparingly soluble precipitate. The inhibitor slowly leaches into the produced water over a period of time and protects the well from scale deposition. The "shut-in" treatment needs to be done regularly e.g. one or more times a year at least if high production rates are to be maintained and constitutes the "down time" when no production takes place. Over the year there is a reduction in total production corresponding to the number of down times during the squeeze/shut-in operation, as well as reduced production as the scaling problem builds up. However, in some instances the scale inhibitor is poorly retained within the reservoir rock matrix and short squeeze lifetimes are experienced. The net result in these cases is frequent well interventions which impact on both well productivity and field profitability.

DESCRIPTION OF THE INVENTION

We have discovered means for and a method of increasing the effectiveness of production chemicals, in particular scale inhibitors, thereby decreasing the number of times squeezing/shut-in is needed and increasing the production rate. Moreover, we have discovered a formulation for this purpose which is stable to storage and transportation.

Accordingly, the present invention is a process for increasing the effectiveness of production chemicals by reducing the number of squeezing and shut-in operations needed to increase the production rate from an oil well, said process comprising injecting into an oil-bearing rock formation matrix a water-miscible formulation comprising:

(a) a water-miscible surfactant which is a glycol ether and (b) at least one water-miscible oil field or gas field production chemical, said components of the formulation being introduced either as a pre-formed single homogeneous composition, or simultaneously in parallel or sequentially in either order into the rock formation characterised in that after introduction of (a) and (b) into the oil-bearing rock formation matrix, the well is shut-in for a period and, subsequently, the oil-bearing rock formation is over-flushed with an oil.

The glycol ether is suitably an alkyl substituted glycol ether in which the alkyl group may be straight or branched chain and suitably has 3–6 carbon atoms, preferably from 3–5 carbon atoms. The glycol ethers that may be used is suitably a mono alkyl ether of ethylene glycol, diethylene glycol, triethylene glycol, tetraethylene glycol or pentaethylene glycol and is preferably an alkyltriglycol ether and more preferably the alkyl group in the alkyltriglycol ether has 4 carbon atoms and is especially η-butyltriglycol ether (also known as triethylene glycol mono-η-butyl ether). More specifically these include inter alia one or more of Ethylene glycol mono ethyl ether Ethylene glycol mono-n-propyl ether Ethylene glycol mono-iso-propyl ether Ethylene glycol mono-n-butyl ether Ethylene glycol mono-isobutyl ether Ethylene glycol mono-2-butyl ether Ethylene glycol mono-tert-butyl ether Diethylene glycol mono-n-propyl ether Diethylene glycol mono-iso-propyl ether Diethylene glycol mono-n-butyl ether Diethylene glycol mono-isobutyl ether Diethylene glycol mono-2-butyl ether Diethylene glycol mono-tert-butyl ether Diethylene glycol mono-n-pentyl ether Diethylene glycol mono-2-methylbutyl ether Diethylene glycol mono-3-methylbutyl ether Diethylene glycol mono-2-pentyl ether Diethylene glycol mono-3-pentyl ether Diethylene glycol mono-tert-pentyl ether Triethylene glycol mono butyl ether (η-butyltriglycol ether)

Tetraethylene glycol mono butyl ether (η-butyltetraglycol ether) and

Pentaethylene glycol mono butyl ether (η-butylpentaglycol ether)

Where the formulation comprising (a) and (b) is injected into the rock formation as a pre-formed single composition, said formulation is suitably a homogeneous aqueous solution containing the two components in specific proportions so as to maintain the homogeneity of the formulation.

Thus, in the formulation comprising the two components in aqueous solution injected into the oil bearing rock before the over-flush with oil, (a) is suitably at least one surfactant comprising η-butyltriglycol ether in an amount of 1–30% w/w and (b) is preferably at least one oil field or gas field production chemical in an amount of 1–25% w/w.

The oil used for over-flush is suitably the oil produced by the well being treated but may comprise diesel or kerosine and is preferably the oil being produced by the well. The amount of oil used for over-flushing the production well is suitably such that it reaches and flushes a target zone which is up to about 6 meters (20 feet) from the well bore and is suitably in the range from about 4800 to 480000 liters (30 to 3000 bbls).

Following the oil over-flush, the well may be optionally subjected to an additional, final over-flush with an oleaginous or an aqueous stream. The oleaginous stream, where used, is suitably kerosine or diesel whereas the aqueous stream is suitably water which may be from fresh, tap, river, sea, produced or formation water, with a total salinity of eg 0–250 g/l such as 5–50 g/l and may have a pH of 0.5–9 and is preferably sea-water.

In another aspect, the present invention is a method of introducing a formulation comprising an oil field or gas field production chemical and a surfactant into a rock formation matrix comprising oil and/or gas, which process comprises (A) passing the formulation down a production well and thereby into before finally over-flushing said well with an oleaginous or aqueous stream.

The invention also provides for the process of the invention to increase the effectiveness of the oil field or gas field production chemical in a rock formation matrix, in particular by increasing the duration of retention of the chemical by the rock formation matrix.

The formulation comprising components (a) and (b) defined above may be a pre-formed homogeneous formulation. By the expression "homogeneous formulation" as used herein and throughout the specification is meant that the formulation is a single phase system. That is, each component is in itself homogeneous and is water-miscible when introduced sequentially or simultaneously into the rock formation matrix and is also homogeneous if introduced into the rock formation matrix as a pre-formed single composition.

It would be apparent that where the components (a) and (b) of the formulation are introduced simultaneously but separately, or, sequentially, it is not introduced as a pre-formed single composition and hence the concept of the formulation being homogeneous does not apply. In the sequential introduction of components (a) and (b), the injected glycol ether (a) may, in most instances, 'move' at a lower velocity than the scale inhibitor (b). In such a case, a double slug deployment system could be used. For instance, a slug of glycol ether (a) could be injected into the formation first, followed by a slug of scale inhibitor (b). The two could then be overflushed into the near wellbore in the usual way that scale squeeze treatments are performed. Optionally, a spacer of seawater can be placed between the two parts of the main treatment, and in this case, the overflush could be sized to achieve mixing of the two slugs in the reservoir (assuming that the relative velocities of the glycol ether (a) and the scale inhibitor (b) are known). It is preferable that each of the components used is homogeneous in itself and is also water-miscible. The pH of the formulation is suitably from 0.1–6.0 and is as a whole is of significance only when such a pre-formed composition is employed. The pH of the component (b) is preferably controlled as specified.

Thus, the surfactant used suitably comprises at least one glycol ether and at least one production chemical and it preferably remains clear and stable over a range of temperatures from ambient to at least about 45° C. The surfactant is suitably present in the formulation in an amount ranging from 1–30% by weight, preferably from 5 to 20% by weight, more preferably from 5 to 15% by weight. In the present invention it is possible to use by-product streams from glycol ether manufacturing processes which contain a high proportion of glycol ethers, especially alkyltriglycol ethers such as eg η-butyltriglycol ether. One such by-product stream comprises about 75% w/w of η-butyltriglycol ether, about 2.5% w/w of butyldiglycol ether, about 19% of butyl tetraglycol ether and about 2% of butyl pentaglycol ether. The relative proportions of components (a) and (b) in the formulation may vary within wide ranges depending upon whether the components are introduced into the rock formation matrix simultaneously, sequentially or as a pre-formed single composition consistent with the need to maintain homogeneity at the operative temperatures and salinity of the formulation. For instance, at relatively higher concentrations of the surfactant or at relatively higher temperatures or extremely low temperatures, it is possible that a pre-formed formulation loses its homogeneity due to reduced solubility of one or more components in the formulation under those conditions. In these instances, small amounts of a solubilizing agent such as eg a lower aliphatic alcohol, especially methanol or ethanol, can either be added to the inhomogeneous pre-formed formulation or used to partially replace the surfactant in the formulation to restore the homogeneity of the formulation.

Thus, the pre-formed, homogeneous formulations used in the present invention may contain, in addition to the alkyltriglycol ether, a cosolvent such as eg a lower aliphatic alcohol, especially methanol or ethanol and may be introduced into the production well in an aqueous medium.

The aqueous medium in the formulation may be from fresh, tap, river, sea, produced or formation water, with a total salinity of eg 0–250 g/l such as 5–50 g/l and may have a pH of 0.5–9. Where sea water is used, the formulation usually has a highly acidic pH in the region of 0.1 to 1.5 due to the presence of a highly acidic production chemical, such as eg a scale inhibitor. In such cases it may be necessary to neutralise the acidity of the formulation by using an alkali metal hydroxide, especially sodium hydroxide, potassium hydroxide or lithium hydroxide, in order to bring the pH of the formulation to within the preferred range from 0.1–6.0. It has been found for instance that use of lithium hydroxide as a neutralising agent instead of the other alkali metal hydroxides allows tolerance of relatively higher levels of the surfactant in the formulation when it is required to maintain homogeneity of the formulation.

The oil field or gas field production chemical may be an inhibitor of: (i) corrosion, (ii) scale, (iii) gas hydrate formation, (iv) wax or (v) asphaltene deposition, or, may be a hydrogen sulphide scavenger or wax dispersant. The scale inhibitor is effective in stopping calcium and/or barium scale with threshold amounts rather than stoichiometric amounts. It may be a water-soluble organic molecule with at least 2 carboxylic and/or phosphonic acid and/or sulphonic acid groups e.g. 2–30 such groups. Preferably the scale inhibitor is an oligomer or a polymer, or may be a monomer with at least one hydroxyl group and/or amino nitrogen atom, especially in a hydroxycarboxylic acid or hydroxy or aminophosphonic, or, sulphonic acid. The inhibitor is used primarily for inhibiting calcium and/or barium scale. Examples of such compounds used as inhibitors are aliphatic phosphonic acids with 2–50 carbons, such as hydroxyethyl diphosphonic acid, and aminoalkyl phosphonic acids, e.g. polyaminomethylene phosphonates with 2–10 N atoms e.g. each bearing at least one methylene phosphonic acid group; examples of the latter are ethylenediamine tetra(methylene phosphonate), diethylenetriamine penta(methylene phosphonate) and the triamine- and tetramine-polymethylene phosphonates with 2–4 methylene groups between each N atom, at least 2 of the numbers of methylene groups in each phosphonate being different (e.g. as described further in published EP-A-479462. Other scale inhibitors are polycarboxylic acids such as lactic or tartaric acids, and polymeric anionic compounds such as polyvinyl sulphonic acid and poly(meth)acrylic acids, optionally with at least some phosphonyl or phosphinyl groups as in phosphinyl polyacrylates. The scale inhibitors are suitably at least partly in the form of their alkali metal salts e.g. sodium salts.

Examples of corrosion inhibitors are compounds for inhibiting corrosion on steel, especially under anaerobic conditions, and may especially be film formers capable of being deposited as a film on a metal surface e.g. a steel surface such as a pipeline wall. Such compounds may be non- quaternised long aliphatic chain hydrocarbyl N-heterocyclic compounds, where the aliphatic hydrocarbyl group may be as defined for the hydrophobic group above; mono- or di-ethylenically unsaturated aliphatic groups e.g. of 8–24 carbons such as oleyl are preferred. The N-heterocyclic group can have 1–3 ring nitrogen atoms with 5–7 ring atoms in each ring; imidazole and imidazoline rings are preferred. The ring may also have an aminoalkyl e.g. 2-aminoethyl or hydroxyalkyl e.g. 2-hydroxyethyl substituent. Oleyl imidazoline may be used.

The gas hydrate inhibitor may be a solid polar compound, which may be a polyoxyalkylene compound or alkanolamide, or tyrosine or phenylalanine.

The asphaltene inhibitor may be an amphoteric fatty acid or a salt of an alkyl succinate while the wax inhibitor may be a polymer such as an olefin polymer e.g. polyethylene or a copolymeric ester, e.g. ethylene- vinyl acetate copolymer, and the wax dispersant may be a polyamide. The hydrogen sulphide scavenger may be an oxidant, such as an inorganic peroxide, e.g. sodium peroxide, or chlorine dioxide, or an aldehyde eg of 1–10 carbons such as formaldehyde or glutaraldehyde or (meth)acrolein.

The amount of production chemical used is in the range from 1–25% w/w of the total formulation, suitably from 5–15% w/w, preferably from 6–10% w/w. Within these ranges the amount used would depend upon the nature of the chemical used and its intended purpose.

It is important that the formulations used in the present invention, especially those comprising a pre-formed homogeneous composition remain clear and stable over a temperature range from ambient to least about 45° C. However, within the concentration ranges of the components (a) and (b) specified above, it is possible to devise formulations which remain stable over a much wider temperature range eg from ambient to the temperature of the production well (eg from 90 to about 150° C., especially around 110° C.) into which the formulation is introduced. In the present invention, when the components (a) and (b) of the formulation are injected under pressure into the production well either as a pre-formed formulation, simultaneously or sequentially, the production chemicals in the formulation are adsorbed by the rock formation matrix and are retained for relatively long periods. By using a relatively small molecule such as eg a $C_3$–$C_6$(alkyl)triglycol ether as the surfactant, use of big surfactant molecules (having >$C_6$ alkyl groups) are avoided thereby minimising any risk of surfactant aggregates being formed which in turn may result in high viscosity emulsions causing blockage of the wells.

Thus, such a formulation may contain, in addition, other components such as (i) other production chemicals or (ii) cosolvents which, when necessary, enable the formulation to remain stable at relatively higher temperatures or when the surfactant is used in concentrations in the upper quartile of the range specified. However, such formulations should be substantially free of water-immiscible components.

If a pre-formed homogeneous formulation is used in the present invention, it may be suitably made by adding the surfactant to an aqueous solution of the oil field or gas field production chemical followed by gentle mixing. If the material made initially is cloudy, then minor adjustments to the relative proportions of the ingredients or a change in the nature or amount of the cosolvent used or the temperature will be needed. Their viscosity is suitably such that at the reservoir temperature, eg at 100° C., they are easy to pump downhole. The pre-formed formulations used in the present invention may be prepared via a concentrate of ingredients (a) and (b), which can be transported as such to the site of use, where it is mixed with the aqueous medium in appropriate proportions to achieve the desired degree of homogeneity and into which the chemical has been dissolved. The pre-formed formulation can be injected, suitably under pressure, into an oil bearing zone, eg rock formation matrix, via a producing well e.g. down the core. Alternatively, the components (a) and (b) of the formulation can be injected into the production well simultaneously or sequentially. The formulation is then left ("shut-in") in the oil bearing zone while oil production is stopped temporarily. During this process, the injected formulation percolates through the oil bearing zone under the injection pressure. In the shut-in period, the injected formulation comes into contact with reservoir fluids and forms in situ a two-phase or three-phase system which may be in the form of an emulsion and which exhibits the desired surface and phase behaviour. This is the so called "squeezing" effect which enables the maintenance of oil recovery from such zones. A desirable contact time of 5–50 hrs e.g. 20–30 hrs is often achievable with the formulations of the present invention. The shut-in process involving the introduction of components (a) and (b) can be optionally preceded by a pre-flush of the oil-bearing rock formation matrix using an oil such as diesel, kerosine or crude oil. Whichever method is used to introduce these components (a) and (b) into the oil- bearing rock formation in the production well, this is followed by a subsequent separate step of over-flushing the production well with an oil. The oil used may be crude oil, kerosine or diesel and is preferably the crude oil being produced by the well. In the latter case, the over-flush may be carried out in an inverse way eg as a back-sweep ie by making the crude oil as it emerges to the surface from the production well perform the function of the over-flush oil. Finally and optionally, an oleaginous stream such as kerosine or diesel, or, an aqueous stream, which can be sea water, is injected into the production well as an additional overflush and can be sea water. After this period the oil production can be re-started. In the case where the production chemical is a scale inhibitor, the oil production rate will be initially high, as will the soluble calcium content of the produced water. Over time, e.g. 2–4 months, the rate of production will decrease and the soluble salt contents will also decrease signifying possible scaling problems in the rock formation, whereupon the production can be stopped and a fresh aliquot of the formulation injected into the well. Similar methods can be used to achieve asphaltene inhibition, wax inhibition or dispersion and hydrogen sulphide scavenging, while for corrosion and gas hydrate inhibition, the formulation is usually injected continuously downhole.

A further feature of the process of the present invention is that when a multi-phase composition comprising eg a scale-inhibitor, oil and a glycol ether is recovered at the surface after the above procedure of squeezing and upon subsequent cooling thereof, most of the glycol ether enters in the aqueous phase rather than the oil phase of this composition. Thus, the glycol ether does not cause any problems either in subsequent production or refining operations such as eg contributing to any haze formation in fuels due to the presence of solubilized water in the glycol ether. Moreover, if the separated aqueous phase is discharged into the sea, then biodegradation of dissolved glycol ether can be relatively rapid in the thermal layer of the sea thereby minimising pollution. Furthermore, the formulations of the present invention can increase the effectiveness of the oil field or gas field chemical e.g. by two-fold in the case of scale inhibitors, so that less chemical would be usually needed per year and the down time due to application of the chemical and shut-in would also be correspondingly reduced thereby increasing the production rate.

The process can be operated equally efficiently by injecting the components of the formulation sequentially into the production well.

EXAMPLE

The present invention is illustrated in the following Examples.

Example 1

In the experiments described below a surfactant, where used, was a commercial mixed glycol ether (hereafter "Solvent 14") and had the following approximate composition in the general formulation below:

| | |
|---|---|
| n-Butyltriglycol ether | 75% W/W |
| n-Butyldiglycol ether | 2.5% W/W |
| n-Butyltetraglycol ether | 19.0% W/W |
| n-Butylpentaglycol ether | 2.0% W/W |

1.1 The process of the present invention was tested using the following formulation and procedure:

A stainless steel tube (1.524 meters long, internal diameter 9.525 mm diameter) was dry packed with a mixture of sand and barite (ratio of 70:30 by weight). The sand was crushed Clashach sandstone which provided a controlled and a permeability of about 334 milli Darcy. The steel tube was coiled, weighed and placed in an oven. The packed tube was initially flushed with sea-water (adjusted to a pH value of 2 using hydrochloric acid) at the rate of 30 ml/hour until the pH value of the effluent emerging from the sandpack was also 2. The pack was then removed and weighed to determine the liquid pore volume of the pack. Thereafter, the sandpack was flushed with a fresh aliquot of sea-water adjusted to a pH value of 5.5 at the rate of 30 ml/hour until the pH value of the emergent sea-water from the sandpack was also 5.5. The oven was then switched on and raised to 110° C. A confining over-pressure of 20 bar was placed on the tube to maintain any fluids within the tube in a liquid state. When the pack had reached 110° C., the pack was flushed with Fortes Crude oil (100 ml using an oil injection vessel). The pack was then left at this temperature for 1 hour. The oil saturated pack was then flushed with sea-water adjusted to pH value of 5.5 at the rate of 30 ml/hour until no oil was visible in the effluent water emerging from the pack. At this point the sandpack was believed to be at its residual oil concentration.

After this conditioning of the sandpack, the treatment was commenced. 2 pore volumes of a solution of 8% w/w of Solvent 14 in sea-water was pumped into the conditioned sandpack at the rate of 30 ml/hour without any adjustment of the pH and this was shut in for 6 hours. This was followed by introduction into the sandpack of a 10% w/w slug (2 pore volumes at the rate of 30 ml/hour) of the scale inhibitor Dequest® 2060S (scale inhibitor, ex Monsanto) in sea-water adjusted to a pH value of 2 using solid sodium hydroxide and this was then shut in for a period of about 12 hours. At the end of the 12 hour period, 10 pore volumes of Fortes Crude oil was pumped through the sandpack at 30 ml/hour as overflush over a period of about 5 hours. At the end of this period a post-flush treatment was carried out on the over-flushed sandpack using sea-water adjusted to a pH value of 5.5. 4 ml fractions of seawater emerging through the back-pressure regulator were collected using a Pharmacia fraction collector. These were analysed for phosphorus content using inductively coupled plasma spectroscopy and the phosphorus concentrations converted to absolute concentrations of the Dequest® 2060S scale inhibitor.

1.2 The above process of the present invention was compared for effectiveness of scale inhibition of a sandpack pre-conditioned as described in Example 1.1 above and using a formulation containing no surfactant and using no over-flush with oil and containing only Dequest® 2060S (10 parts by weight) and sea-water (90 parts by weight) for a simulated squeeze treatment process.

Two results of these experiments, one with the formulation described in Example 1.1 above, and the other with a control which contained the relevant inhibitor at the same % w/w and pH=2 and sea-water only are tabulated below.

The relationship of the inhibitor level of the effluent to the volume of sea-water passed through the sandpack (expressed as number of pore volumes of the solution) is a measure of the amount of inhibitor taken up by the rock formation initially and on its rate of release, ie a measure of the rate of removal of the inhibitor from the rock formation during production (ie its resistance to leaching) and hence is a measure of its effectiveness in inhibiting scaling with time. The results appear in Table 1 below:

TABLE 1

| Example 1.1 | | Control 1.2 (Comparative Test) | |
|---|---|---|---|
| No. Pore Vols | Inhibitor Conc(ppm) | No. Pore Vols | Inhibitor Conc(ppm) |
| 0.26 | 29851.85 | 0.29 | 629.63 |
| 0.53 | 35333.33 | 0.58 | 12333.33 |
| 0.79 | 35814.81 | 0.88 | 25185.19 |
| 1.05 | 34592.59 | 1.17 | 28518.52 |
| 1.31 | 35148.15 | 1.46 | 29629.63 |
| 2.10 | 35629.63 | 2.34 | 31851.85 |
| 2.89 | 21518.52 | 2.92 | 20740.74 |
| 3.68 | 11296.30 | 3.80 | 9111.11 |
| 4.99 | 5111.11 | 4.96 | 311.11 |
| 6.04 | 3185.19 | 6.13 | 1407.41 |
| 7.10 | 2259.26 | 7.30 | 666.67 |
| 8.15 | 1740.74 | 8.18 | 418.52 |
| 9.72 | 1222.22 | 9.64 | 251.85 |
| 10.78 | 1037.04 | 10.80 | 229.63 |
| 12.88 | 814.81 | 12.85 | 192.59 |
| 13.14 | 851.85 | 13.14 | 181.48 |
| 13.93 | 740.74 | 14.01 | 155.56 |
| 15.24 | 629.63 | 15.18 | 148.15 |
| 16.56 | 814.81 | 16.64 | 151.85 |
| 16.82 | 888.89 | 16.93 | 148.15 |
| 17.35 | 703.70 | 17.52 | 151.85 |
| 18.66 | 555.56 | 18.69 | 103.70 |
| 20.50 | 518.52 | 30.44 | 129.63 |
| 21.81 | 444.44 | 21.90 | 125.63 |
| 25.23 | 370.37 | | |

What is claimed is:

1. A process for increasing the effectiveness of production chemicals by reducing the number of squeezing and shut-in operations needed to increase the production rate from an oil well, said process comprising the steps of:
  injecting into an oil-bearing rock formation matrix a water-miscible formulation comprising as components:
  (a) a water-miscible surfactant which is a glycol ether and
  (b) at least one water-miscible oil field or gas field production chemical, said components of the formulation being introduced either as a pre-formed single composition, or simultaneously in parallel or sequentially in either order into the rock formation;

after introduction of (a) and (b) into the oil-bearing rock formation matrix, shutting-in the well for a period; and, subsequently, over-flushing the oil-bearing rock formation matrix with an oil.

2. A process according to claim 1 wherein the glycol ether is an alkyl substituted glycol ether in which the alkyl group may be straight or branched chain and has 3–6 carbon atoms.

3. A process according to claim 1 wherein the glycol ether is a mono alkyl ether of at least one glycol selected from the group consisting of ethylene glycol, diethylene glycol, triethylene glycol, tetraethylene glycol and pentaethylene glycol.

4. A process according to claim 1 wherein the glycol ether is an alkyltriglycol ether.

5. A process according to claim 1, wherein the glycol ether is at least one glycol ether selected from the group consisting of ethylene glycol mono-ethyl ether
ethylene glycol mono-n-propyl ether
ethylene glycol mono-iso-propyl ether
ethylene glycol mono-isobutyl ether
ethylene glycol mono-2-butyl ether
ethylene glycol mono-tert-butyl ether
diethylene glycol mono-n-propyl ether
diethylene glycol mono-iso-propyl ether
diethylene glycol mono-n-butyl ether
diethylene glycol mono-isobutyl ether
diethylene glycol mono-2-butyl ether
diethylene glycol mono-tert-butyl ether
diethylene glycol mono-n-pentyl ether
diethylene glycol mono-2-methylbutyl ether
diethylene glycol mono-3-methylbutyl ether
diethylene glycol mono-2-pentyl ether
diethylene glycol mono-3-pentyl ether
diethylene glycol mono-tert-pentyl ether
triethylene glycol mono butyl ether ($\eta$-butyltriglycol ether)
tetraethylene glycol mono butyl either ($\eta$-butyltetraglycol ether) and
pentaethylene glycol mono butyl either ($\eta$-butylpentaglycol ether).

6. A process according to claim 1 wherein the formulation comprising components (a) and (b) is injected into the rock formation matrix as a pre-formed, single, homogeneous aqueous solution containing the two components in specific proportions so as to maintain the homogeneity of the formulation.

7. A process according to claim 1, wherein the oil used for over-flush is the oil produced by the well being treated.

8. A process according to claim 7 wherein the amount of oil used for over-flushing the production well is in the range from about 4800–480000 liters (30 to 3000 bbls) and is capable of reaching and flushing a target zone which is up to about six meters (20 feet) from the well bore.

9. A process according to claim 7, wherein the oil used for overflush comprises diesel or kerosene.

10. A process according to claim 1 wherein, following the oil over-flush, the well is subjected to an additional, final over-flush with an oleaginous or an aqueous stream.

11. A process according to claim 10, wherein the oleaginous stream is selected from the group consisting of kerosene and diesel; and the aqueous stream is water having a total salinity of 0.250 g/l and a pH of 0.5–9.

12. A process according to claim 11, wherein the water is selected from the group consisting of fresh water, tap water, river water, sea water, produced water and formation water.

13. A process according to claim 1, wherein the formulation comprising components (a) and (b) is introduced into the rock formation matrix sequentially such that a slug of (a) is followed by a slug of (b).

14. A process according to claim 13, wherein a spacer slug of sea water is employed between the steps of injecting the slugs of (a) and (b).

15. A process according to claim 1 wherein the surfactant comprises at least one glycol ether and at least one production chemical which remains clear and stable over a range of temperatures from ambient to at least 45° C.

16. A process according to claim 1 wherein the surfactant (a) is present in the formulation in an amount ranging from 1–30% by weight and the production chemical (b) is present in an amount ranging from 1–25% by weight.

17. A process according to claim 1 wherein the surfactant is a by-product stream from glycol ether manufacturing processes and contains a high proportion of alkyltriglycol ethers.

18. A process according to claim 17 wherein the surfactant comprises about 75% w/w of $\eta$-butyltriglycol ether, about 2.5% w/w of butyldiglycol ether, about 19% of butyl tetraglycol ether and about 2% of butyl pentaglycol ether.

19. A process according to claim 1 wherein the pre-formed, homogeneous formulations where used contains, in addition to the glycol ether surfactant, a cosolvent selected from a lower aliphatic alcohol which is introduced into the production well in an aqueous medium.

20. A process according to claim 19 wherein the aqueous medium in the formulation comprises water selected from the group consisting of fresh water, tap water, river water, sea water, produced water and formation water, with a total salinity of 0–250 g/l and has a pH of 0.5–9.

21. A process according to claim 1 wherein the oil field or gas field production chemical is an inhibitor selected from the group consisting of (a) corrosion, (ii) scale, (iii) gas hydrate formation, (iv) wax and (v) asphaltene deposition.

22. A process according to claim 21 wherein the scale inhibitor is one that is effective in stopping calcium and/or barium scale with threshold amounts rather than stoichiometric amounts and is a water-soluble organic molecule which has at least 2 groups selected from carboxylic, phosphonic acid and sulphonic acid groups.

23. A process according to claim 22 wherein the scale inhibitor is selected from an oligomer, a polymer or a monomer which has at least one hydroxyl group or amino nitrogen atom.

24. A process according to claim 22 wherein the scale inhibitor is selected from a hydroxycarboxylic acid, a hydroxy or aminophosphonic, and a sulphonic acid.

25. A process according to claim 22 wherein the scale inhibitor is selected from the group consisting of an aliphatic phosphonic acid having 2–50 carbons, an aminoalkyl phosphonic acid, a polyaminomethylene phosphonate having 2–10 N atoms and each bearing at least one methylene phosphonic acid group, a polycarboxylic acid and a polymeric anionic compound selected from the group consisting of polyvinyl sulphonic acid and a poly(meth)acrylic acid which optionally has at least a phosphonyl or a phosphinyl group.

26. A process according to claim 25, wherein said polyvinyl sulphonic acid and poly(meth)acrylic acid optionally has at least a phosphonyl or phosphinyl group.

27. A process according to claim 22 wherein the scale inhibitor is selected from the group consisting of hydroxyethyl diphosphonic acid; ethylenediamine tetra(methylene phosphonate), diethylenetriamine penta(methylene phosphonate) and the triamine- and tetramine-polymethylene phosphonates having 2–4 methylene groups between each N atom, at least 2 of the numbers of methylene groups in each phosphonate being different; lactic acid and tartaric acid; and polyvinyl sulphonic acid, poly(meth) acrylic acid, phosphinyl polyacrylates and phosphinyl polyacrylate.

28. A process according to claim 21 wherein the scale inhibitor employed is at least partly in the form of its alkali metal salt.

29. A process according to claim 21 wherein the corrosion inhibitors are capable of inhibiting corrosion on steel and are film formers capable of being deposited as a film on the surface thereof.

30. A process according to claim 29 wherein the corrosion inhibitor is a non-quaternised long aliphatic chain hydrocarbyl N-heterocyclic compound containing a mono- or di-ethylenically unsaturated aliphatic group.

31. A process according to claim 30 wherein the N-heterocyclic compound has 1–3 ring nitrogen atoms and a total of 5–7 ring atoms in each ring.

32. A process according to claim 33 wherein the N-heterocyclic compound comprises an imidazole or an imidazoline ring.

33. A process according to claim 32 wherein the imidazoline ring has an aminoalkyl or a hydroxyalkyl substituent.

34. A process according to claim 33 wherein the N-heterocyclic compound is selected from the group consisting of 2-aminoethyl imidazoline, 2-hydroxyethyl imidazoline and oleyl imidazoline.

35. A process according to claim 21 wherein the gas hydrate inhibitor is a solid polar compound selected from a polyoxyalkylene compound, an alkanolamide, tyrosine and phenylalanine.

36. A process according to claim 21 wherein the asphaltene inhibitor is an amphoteric fatty acid or a salt of an alkyl succinate.

37. A process according to claim 21 wherein the wax inhibitor is a polymer or a copolymer selected from the group consisting of an olefin polymer and a copolymeric ester.

38. A process according to claim 37 wherein the wax inhibitor is polyethylene or an ethylene- vinyl acetate copolymer.

39. A process according to claim 21, wherein the oil field or gas field production chemical is a hydrogen sulphide scavenger.

40. A process according to claim 39 wherein the hydrogen sulphide scavenger is selected from the group consisting of an inorganic peroxide, chlorine dioxide, an aldehyde having 1–10 carbon atoms and an unsaturated ketone.

41. A process according to claim 21, wherein the oil field or gas field production chemical is a wax dispersant.

42. A process according to claim 41 wherein the wax dispersant is a polyamide.

43. A process according to claim 1 wherein the amount of production chemical used is in the range from 1–25% w/w of the total formulation.

* * * * *